United States Patent [19]

Sakai

[11] Patent Number: 4,693,208
[45] Date of Patent: Sep. 15, 1987

[54] FEEDER OF OXYGEN GAS CONTAINING STEAM

[75] Inventor: Takamasa Sakai, Kusatsu, Japan

[73] Assignee: Dainippon Screen Mfg. Co., Ltd., Kyoto

[21] Appl. No.: 885,697

[22] Filed: Jul. 15, 1986

[30] Foreign Application Priority Data

Jul. 15, 1985 [JP] Japan ................................ 60-156708

[51] Int. Cl.⁴ .............................................. C23C 8/16
[52] U.S. Cl. .................................... 118/724; 118/715; 422/129; 422/200; 422/202; 422/240
[58] Field of Search ....................... 118/715, 719, 724; 427/93; 422/129, 200, 202, 240

[56] References Cited

U.S. PATENT DOCUMENTS 4,268,538  5/1981  Toole ................................. 427/93

FOREIGN PATENT DOCUMENTS 59-53697  12/1984  Japan .

Primary Examiner—Richard Bueker
Attorney, Agent, or Firm—Lowe, Price, LeBlanc, Becker & Shur

[57] ABSTRACT

A feeder of oxygen gas containing steam comprising a combustion chamber, an oxygen gas induction tube for inducing oxygen gas to the combustion chamber, a hydrogen gas chamber separated from the combustion chamber by a hydrogen osmotic film between it and the combustion chamber, a hydrogen gas induction chamber which induces the hydrogen gas to the hydrogen gas chamber, an exhaust tube communicated with the hydrogen gas chamber and a heater.

7 Claims, 8 Drawing Figures

FEEDER OF OXYGEN GAS CONTAINING STEAM

BACKGROUND OF THE INVENTION

1. Field of the Invention

The present invention relates to a feeder of oxygen gas containing steam of high purity and distributed uniformly for use in heat treatment process of semiconductor manufacturing in which a heated wafer of semiconductor is fed with oxygen gas containing steam, and the steam is deposited on the surface of the semiconductor wafer to form an oxide film thereon serving as a protective coat.

2. Description of Prior Art

Hitherto, as one of feeders of oxygen gas containing steam of this kind, a feed for bubbling method is well known as shown in FIG. 7. According to this prior feeder, oxygen gas is blown into pure water 2 stored in a sealed vessel 1 in the direction of arrow as shown in FIG. 7, and the oxygen gas damped by passing through the pure water 2 is fed. By such method, however, since a vessel or reservoir is used for pure water storage, it is impossible to maintain the purity required in manufacturing a semiconductor device. Moreover, there is a drawback in its operability since the pure water has to be often changed or replenished in the vessel.

In order to meet such drawbacks, a so-called pyrogenic method is popularly used these days as shown in FIG. 8. According to this recent method, oxygen gas is induced to a quartz tube 4 in which semiconductor wafers 8 are aligned on a supporting board 9 by way of an induction pipe 5, while hydrogen gas is induced to such oxygen gas atmosphere by way of an induction pipe 6, and steam is generated by combustion of the induced hydrogen gas. Then oxygen gas containing the generated steam is deposited on the surface of the semiconductor wafers 8 to form an oxide film thereon. In FIG. 8, numeral 7 denotes a flame of hydrogen and 10 denotes a heater disposed along the outer wall of the quartz tube 4.

3. Problems to be Solved

By the aforementioned pyrogenic method, indeed it is possible to maintain a purity required in the semiconductor manufacturing porcess, but there still exist following drawbacks:

(1) It is hard to control the hydrogen flame, and there is the possibility of failure in ignition, which may cause explosion.

(2) Front end of the hydrogen flame may sometimes reaches the surface of the semiconductor wafer and damages it.

(3) Uneven gas stream in which only down stream portion of the hydrogen flame contains high steam may be generated, whereby the result of solid surface treatment becomes ununiform particularly in the case of a semiconductor wafer of large diameter, eventually causing a problem of quality of such wafer.

In order to meet such drawbacks, several attempts have been proposed. According to one of them, the quartz tube is elongated so as to have a larger distance between the hydrogen flame and the semiconductor wafer. According to Japanese Patent Publication (examined) No. Sho 59-53697, a nozzle of special design is proposed for induction of hydrogen gas. Further, as a method for achieving uniformity of hydrogen gas content, a separate combution chamber system is employed wherein a combustion chamber is separated from a heat treatment chamber of semiconductor wafer, and both chambers are communicated with each other through a connector.

Even when employing such separate system, the problem of above (1) still remains unsolved, and moreover inner wall surface of the combustion chamber is damaged by the hydrogen flame resulting in a further problem of mixing impurities in the gas.

SUMMARY OF THE INVENTION

The invention is proposed to solve all of the aforesaid problems, and wherein oxidation catalyzer is used for combustion of hydrogen. The oxidation catalyzer is formed into a hydrogen osmotic film serving as a bulkhead, and a combustion chamber to which oxygen gas is fed and a hydrogen gas chamber to which hydrogen gas is fed are disposed using the hydrogen osmotic film as a bulkhead. An exhaust tube for exhausting hydrogen gas not transmitted through the hydrogen osmotic film of oxidation catalyzer is communicated with the hydrogen gas chamber, and heating means for heating gas of reaction and the hydrogen osmotic film of oxidation catalyzer are disposed in the hydrogen gas chamber or on the outer wall of the combustion chamber. The combustion chamber and a space for receiving objects to be treated such as semiconductor wafers can be formed either into a common chamber or into two separate chambers.

By the feeder of oxygen gas containing steam arranged as above according to the invention, a part of hydrogen gas induced into the hydrogen chamber is physically adsorpted onto the surface of the hydrogen osmotic film of oxidation catalyzer, then by omosis being uniformly diffused all over the surface of the hydrogen osmotic film of oxidation catalyzer, and reacts with the oxygen gas excessively existing on the opposite side, i.e., in the combustion chamber to generate steam. Since such oxidative combusion of hydrogen gas is taken place as catalytic oxidation by the catalyzer, the reaction is gently but steadily taken place under a relatively low temperature, and when the quantity of gas is small, there is no flame. Further, since the oxidation reaction occurs not partially but uniformly all over the film, mixture of steam generated by the reaction with the atmosphere gas is also evenly performed. When the hydrogen osmotic film is formed of a catalizer having a property of selectively transmitting the hydrogen gas alone, the film also provides a purification of hydrogen bringing about a hydrogen of high purity. A remaining part of hydrogen gas not passing through the hydrogen osmotic film and impurities are exhausted from the hydrogen gas chamber through an exhaust tube as bleed gas.

In view of the aforesaid arrangement and function, a feeder of oxygen gas containing steam according to the invention insures following advantages:

(1) Since the combustion (i.e., oxidation) of hydrogen gas is gently taken place by catalytic reaction under a relatively low temperature, combustion control is relatively easy, and there is less possibility of ignition failure or danger of explosion.

(2) In the combustion of hydrogen gas, the combustion area is not spread to the extent of generating flame, and accordingly the semiconductor wafer is not damaged by the flame. When employing said separate combustion chamber system, there is no possibility of mixing impurities due to damage to the inner wall of the combustion chamber by hydrogen flame.

(3) Since the combustion of hydrogen gas is evenly carried out all over the hydrogen osmotic film of oxidation catalyzer, mixture of generated steam with the oxygen gas (i.e., atmosphere gas) is also uniform, and as a result, even when treating a semiconductor wafer of large diameter, uniform and even surface treatment is applied to all over the wafer surface enabling high quality thereof.

(4) When the hydrogen osmotic film is formed of a material having property of selectively transmitting the hydrogen gas alone such as palladium alloy film, steam generated by the combustion of the hydrogen gas is also of high purity satisfying the purity required in manufacturing process of semiconductors.

Other objects and features of the invention will become apparent in the course of the following description together with the accompanying drawings.

DESCRIPTION OF THE PREFERRED EMBODIMENT

Figure 1:
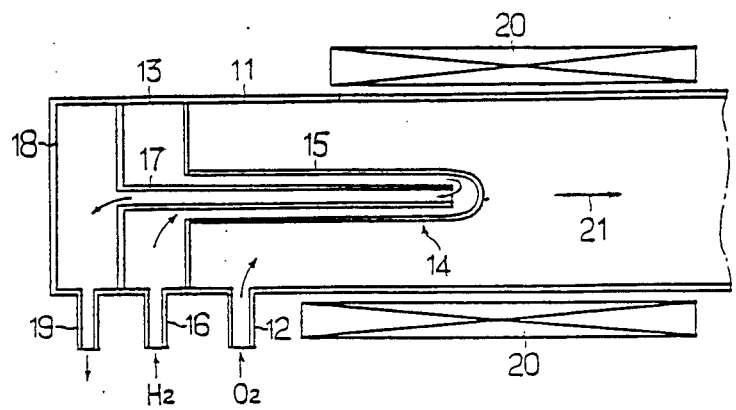
FIG. 1 is a front view of a feeder of oxygen gas containing steam as an embodiment of the invention.

Referring to FIG. 1 showing an embodiment of the invention in the form of a typically illustrated front view, a numeral 11 denotes a combustion chamber made of quartz, and on the right side of this drawing, semiconductor wafers aligned on a supporting board are placed, although not illustrated. An oxygen gas induction tube 12 is communicated with the combustion chamber 11, and the induction tube 12 is connected to an oxygen gas supply source (not illustrated).

Numeral 13 denotes a hydrogen gas chamber 13, a part of which projects toward the combustion chamber 11. A diaphram 15 for a projecting part 14 is formed of a hydrogen osmotic film of oxidation catalysis. This hydrogen osmotic film of oxidation catalysis phisically adsorbs hydrogen gas on its surface and diffuses and transmits the hydrogen while uniformly distributing it all over the film surface. This film undertakes catalysis under the temperature of 300°–700° C., and generates steam by oxidizing the hydrogen. As for the material of said hydrogen osmotic film, a known palladium alloy is used. Such film of palladium alloy is made of palladium (Pd), Silver (Ag) and Gold (Au). The catalysis for hydrogen can be performed by Pd alone, but a film of Pd alone has a drawback in its strength, and therefore Ag and Au are added from the view point of strength. The thickness of the hydrogen osmotic film is desired to be as thin as possible, but it is usually formed not more than 0.5 mm in thickness considering strength on the other hand. The hydrogen gas chamber is communicated with a hydrogen gas induction pipe 16, which is communicated with a hydrogen gas supply source (not illustrated). The hydrogen gas chamber 13 is also communicated with an exhaust chamber 18 by way of an inner pipe 17 inserted therein, and the exhaust chamber 18 is communicated with an exhaust pipe 19. In the drawings, numeral 20 denotes an external heater disposed along the outer wall of the combustion chamber 11 to heat the hydrogen osmotic film and the gas generated by reaction. In addition, it is also possible to dispose a plurality of projecting portions 14 of the hydrogen gas chamber 13 in the combustion chamber 11.

By arranging the feeder as described above, the diaphram 15 composed of the hydrogen osmotic film is heated to the temperature 300°–700° C. Then oxygen gas is induced from the oxygen gas supply source to the combustion chamber 11 by way of oxygen gas in-flow pipe 12. At this time, pressure in the combustion chamber 11 is no more than 1 kg/cm$^2$. Under such state, hydrogen gas is induced from the hydrogen gas supply source to the hydrogen gas chamber 13 through the hydrogen gas in-flow pipe 16. Pressure of the hydrogen gas induced is higher than the inner pressure of said combustion chamber 11, for example, 10 kg/cm$^2$. Thus, a part of the hydrogen gas induced to the hydrogen gas chamber 13 transmits the diaphragm 15 formed of hydrogen osmotic film and reaches the surface of the combustion chamber 11 side, where the hydrogen gas reacts with the oxygen gas excessively existing in the combustion chamber 11 to generate steam. At this step, the diaphram 15 is heated itself by oxidative reaction. Accordingly, when the quantity of hydrogen gas transmitted through the diaphram 15, in other words, the pressure of hydrogen gas supplied to the hydrogen gas chamber 13 is kept at a certain level, heating by the external heater 20 is not necessary since self-heating by oxidative reaction heat is taken place. In addition, when using a film of palladium alloy as a hydrogen osmotic film, since the palladium alloy has a property of refining (purifying) hydrogen as is well known, even if the hydrogen gas supplied to the chamber 13 contains impurities, those impurities does not transmit through the film but hydrogen alone is selectively transmitted. As a result, steam generated in the combustion chamber 11 is uniformly mixed with the oxygen gas existing excessively in the form of atmospheric gas and the mixture is sent in the direction of the arrow 21 to be fed to the semiconductor wafer (not illustrated). In the meantime, a part of the hydrogen gas not transmitted through the diaphram 15 and the impurities are discharged from the exhaust pipe 19 by way of the inner pipe 17 and exhaust chamber 18.

Figure 2:
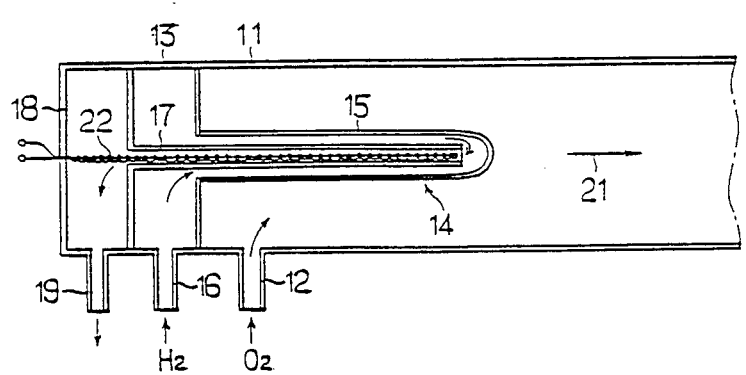
FIGS. 2 to 6 are front views of several modifications of the invention.
Figure 3:
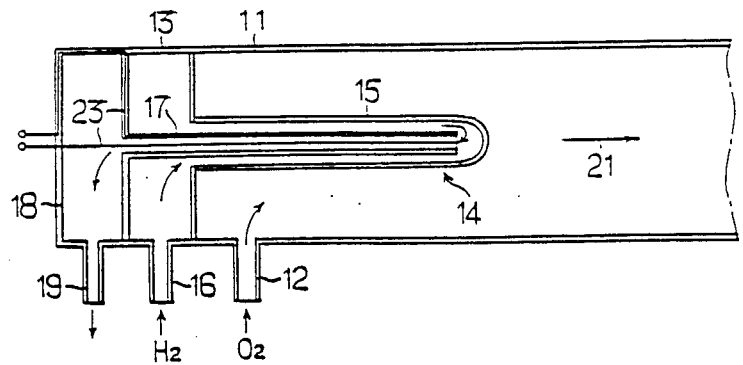

FIGS. 2 and 3 show further embodiments of the invention respectively, and wherein being different from the feeder shown in FIG. 1, heating means are not external heaters but internal heaters 22, 23 inserted in the inner pipe 17 disposed in the hydrogen gas chamber 13. In case of the internal heater 23, the inner pipe 17 itself is formed to be such heater.

Figure 4:
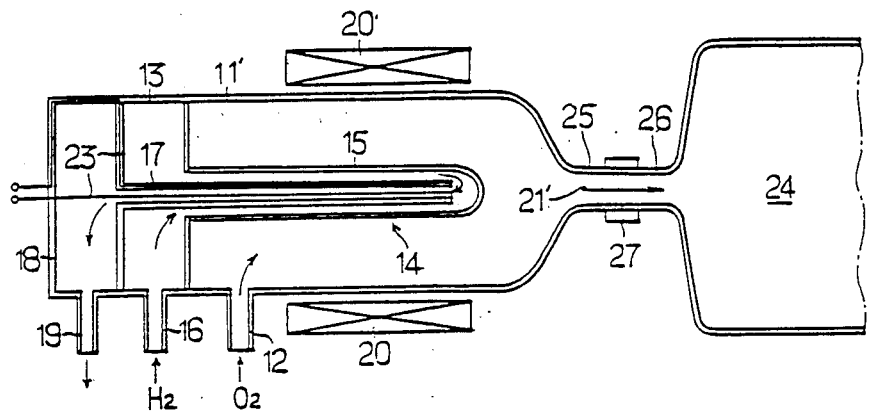

In any of the embodiments described above with reference to FIGS. 1 to 3, the combustion chamber and the space for receiving semiconductor wafers are formed into a common chamber. On the other hand, FIG. 4 shows a further embodiment, wherein a combustion chamber and a heat treatment chamber for semiconductor wafers are separated. In such feeder, the basic structure of the combustion chamber 11' is not different from the embodiments described above, but a diameter of its free end is small and thus a passage thereof is narrowed. Further, a diameter of an end of the heat treatment chamber 24 for semiconductor wafers is also narrowed. Both chambers 11' and 24 are communicated with each other with their neck portions 25, 26 coupled by a connector 27. Thus, mixed gas composed of steam generated in the combustion chamber 11' and oxygen gas which is an atmospheric gas is sent to the heat treatment chamber 24 in the direction of the arrow 21', and during its passage through the narrowed neck portions 25, 26, composition of the mixed gas becomes even and uniform. In addition, as for the heating means, it is possible to dispose either an external heater or an internal heater as shown in FIGS. 1 to 3 or both of an external heater 20 and an internal heater 23 as shown in FIG. 4.

Figure 5:
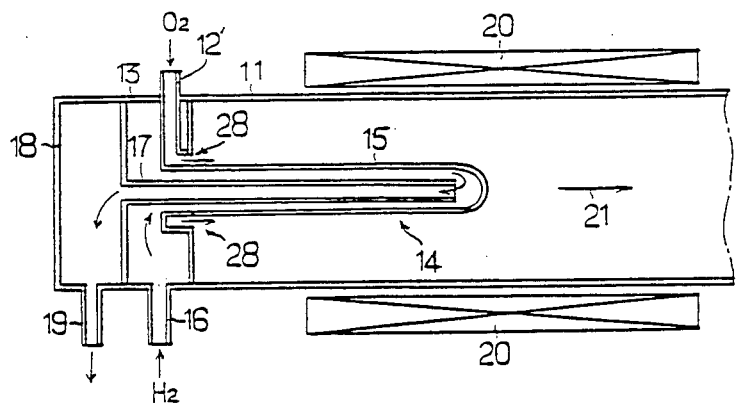
Figure 6:
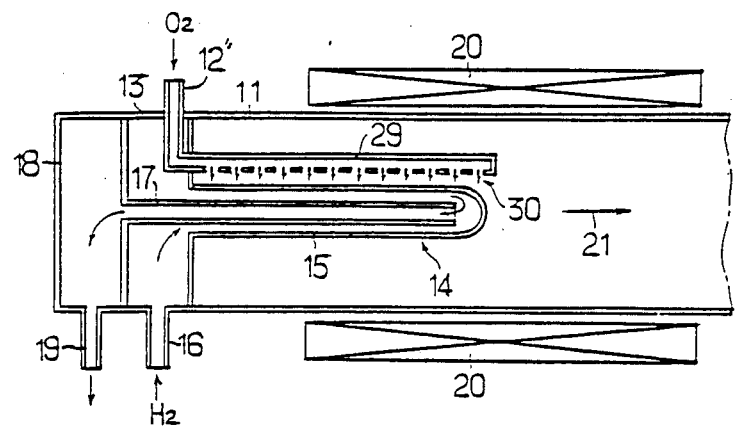
Figure 7:
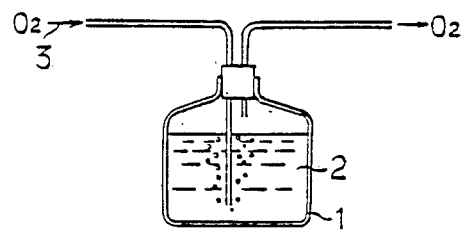
FIGS. 7 to 8 are front views respectively showing prior feeders.
Figure 8:
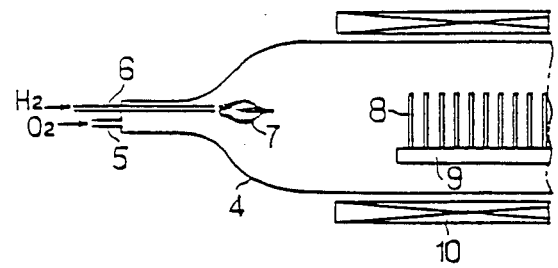

FIGS. 5 and 6 show yet further embodiments of the invention respectively. In the feeder shown in FIG. 5, a gas blow out opening 28 of the oxygen gas induction pipe 12' is disposed near base portion of the diaphragm 15. Accordingly, the oxygen gas induced into the combustion chamber 11 from the oxygen gas induction pipe 12' flows along the surface of the diaphragm 15 and cools the diaphragm 15 of hydrogen osmotic film to prevent it from being overheated by combustion of hydrogen gas. On the other hand, in the feeder shown in FIG. 6, an oxygen gas induction pipe 12" is extended into the combustion chamber 11, and an extending pipe portion 29 thereof is disposed in the longitudinal direction of the diaphragm 15. Further, a plurality of gas blowing outlets 30 are disposed being opposed to the surface of the diaphragm 15. In the case of this feeder, the oxygen gas induced to the combustion room 11 from the oxygen gas induction pipe 12" is blown out perpendicularly to the surface of the diaphragm 15 from the plural gas blowing outlets 30, and as a result air cooling is carried out more effectively than the feeder of FIG. 5.

The scope of the invention is not limited to the description above and the embodiments shown in the drawings. For example, various oxidation catalysis can be formed into a thin hydrogen osmotic film to be used in the invention other than said palladium alloy film, so far as their strength and performance are insured to be a certain level. As for the design and structure also, various modifications are possible unless their basic constitution remains unchanged.

We claim:

1. A feeder of oxygen gas containing steam in which hydrogen gas is fed into an atmosphere of oxygen gas, and oxygen gas containing steam generated by combustion of the hydrogen gas is fed to a treating object, characterized by comprising a combustion chamber, an oxygen gas induction tube which induces the oxygen gas to the combustion chamber, a hydrogen gas chamber separated from said combustion chamber by a hydrogen osmotic film of oxidation catalysis therebetween, a hydrogen gas induction chamber which induces the hydrogen gas to the hydrogen gas chamber, an exhaust tube communicated with said hydrogen gas chamber, and heating means.

2. A feeder of oxygen gas containing steam as claimed in claim 1, wherein said heating means comprise an interanl heater disposed in the hydrogen gas chamber.

3. A feeder of oxygen gas containing steam as claimed in claim 1, wherein said heating means comprise an external heater disposed on an outer wall of the combustion chamber.

4. A feeder of oxygen gas containing steam as claimed in claim 1, wherein said combustion chamber and a treating object holding chamber are formed into a common chamber.

5. A feeder of oxygen gas containing steam as claimed in claim 1, wherein said combustion chamber and a treating object holding chamber are separately formed and communicated with each other.

6. A feeder of oxygen gas containing steam as claimed in claim 1, wherein a gas blowout opening is disposed near the hydrogen osmotic film of oxidation catalysis.

7. A feeder of oxygen gas containing steam as claimed in claim 1, wherein said hydrogen osmotic film of oxidation catalysis is composed of a hydrogen diffusion film of palladium.

* * * * *